US010836384B2

(12) United States Patent
Kim et al.

(10) Patent No.: US 10,836,384 B2
(45) Date of Patent: Nov. 17, 2020

(54) LATERAL ACCELERATION LIMITING DEVICE, SYSTEM INCLUDING THE SAME, AND METHOD THEREFOR

(71) Applicants: HYUNDAI MOTOR COMPANY, Seoul (KR); KIA MOTORS CORPORATION, Seoul (KR)

(72) Inventors: Hoi Won Kim, Gwacheon-si (KR); Kyoung Jun Lee, Seoul (KR); Doo Jin Um, Seoul (KR); Dong Gu Lee, Seoul (KR); Dong Eon Oh, Seoul (KR); Hyun Jae Yoo, Seoul (KR); Beom Jun Kim, Seoul (KR); Dae Young Kim, Gwangmyeong-si (KR); Young Min Han, Gunpo-si (KR); Seung Geon Moon, Hwaseong-si (KR); Sung Woo Choi, Gwangmyeong-si (KR); Chan Il Park, Chungcheongbuk-do (KR); Sung Yoon Yeo, Seoul (KR); Jee Young Kim, Yongin-si (KR); Min Chul Kang, Uiwang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 276 days.

(21) Appl. No.: 15/945,084

(22) Filed: Apr. 4, 2018

(65) Prior Publication Data

US 2019/0126977 A1   May 2, 2019

(30) Foreign Application Priority Data

Nov. 1, 2017   (KR) .................. 10-2017-0144865

(51) Int. Cl.
*B60W 30/095*   (2012.01)
*B62D 6/02*   (2006.01)
(Continued)

(52) U.S. Cl.
CPC ...... *B60W 30/0953* (2013.01); *B60W 30/045* (2013.01); *B60W 30/095* (2013.01);
(Continued)

(58) Field of Classification Search
CPC ...... B62D 6/008; B62D 15/025; B62D 6/003; B62D 15/029; B62D 6/02; G01S 19/48;
(Continued)

(56) References Cited

U.S. PATENT DOCUMENTS

| 6,970,777 B2 | 11/2005 | Tange et al. |
| 7,540,351 B2 | 6/2009 | Kataoka et al. |

(Continued)

FOREIGN PATENT DOCUMENTS

| JP | H08-263790 A | 10/1996 |
| JP | 2006-027532 A | 2/2006 |

(Continued)

OTHER PUBLICATIONS

"How Does GPS Work?", www.eso.org, 2020, Sea & Space Navigation GPS, 3 pages (Year: 2020).*

*Primary Examiner* — Dale W Hilgendorf
(74) *Attorney, Agent, or Firm* — Morgan, Lewis & Bockius LLP

(57) ABSTRACT

A lateral acceleration limiting device may include a processor configured to calculate current lateral acceleration of a vehicle, predict forward lateral acceleration, and determine whether the prediction lateral acceleration and the current lateral acceleration are greater than a predetermine reference value, a controller communicatively connected to the processor and configured to determine whether to generate a warning or whether to adjust steering torque, depending on a result determined by the processor, and a steering torque (Continued)

adjusting device communicatively connected to the processor and configured to adjust the steering torque depending on control of the controller.

17 Claims, 10 Drawing Sheets

(51) Int. Cl.
  *G01S 19/48*   (2010.01)
  *B62D 6/00*   (2006.01)
  *B62D 15/02*   (2006.01)
  *B60W 30/045*   (2012.01)
  *B60W 30/12*   (2020.01)
  *B60W 40/109*   (2012.01)
  *B60W 40/072*   (2012.01)
  *B60W 40/114*   (2012.01)

(52) U.S. Cl.
  CPC ............. *B60W 30/12* (2013.01); *B62D 6/003* (2013.01); *B62D 6/008* (2013.01); *B62D 6/02* (2013.01); *B62D 15/025* (2013.01); *B62D 15/029* (2013.01); *G01S 19/48* (2013.01); *B60W 40/072* (2013.01); *B60W 40/109* (2013.01); *B60W 40/114* (2013.01)

(58) Field of Classification Search
  CPC ........... B60W 30/0953; B60W 30/095; B60W 30/045; B60W 30/12; B60W 40/072; B60W 40/109; B60W 40/114
  See application file for complete search history.

(56) References Cited

U.S. PATENT DOCUMENTS

| | | |
|---|---|---|
| 2008/0251312 A1 | 10/2008 | Goto et al. |
| 2010/0114449 A1* | 5/2010 | Shiozawa et al. .. B60W 30/045 701/90 |
| 2017/0184403 A1* | 6/2017 | Kumabe et al. ........ G01S 19/48 |
| 2017/0326976 A1* | 11/2017 | Burt et al. .......... B60W 30/045 |
| 2018/0178839 A1* | 6/2018 | Ide ....................... B62D 15/025 |
| 2018/0345967 A1* | 12/2018 | Oniwa .................. B60W 30/12 |
| 2018/0346027 A1* | 12/2018 | Fujii .................... B62D 15/025 |
| 2020/0023899 A1* | 1/2020 | Takahashi ............ B62D 5/0463 |

FOREIGN PATENT DOCUMENTS

| | | |
|---|---|---|
| JP | 2006-031553 A | 2/2006 |
| KR | 2006-0121949 A | 11/2006 |
| KR | 10-2014-0059082 A | 5/2014 |

* cited by examiner

LATERAL ACCELERATION LIMITING DEVICE, SYSTEM INCLUDING THE SAME, AND METHOD THEREFOR

CROSS-REFERENCE TO RELATED APPLICATION

This application is based on and claims the benefit of priority to Korean Patent Application No. 10-2017-0144865, filed on Nov. 1, 2017, in the Korean Intellectual Property Office, the entire disclosure of which is incorporated herein by reference.

TECHNICAL FIELD

The present disclosure relates to a lateral acceleration limiting device, a system including the same, and a method therefor, and more particularly, relates to technologies for actively adjusting steering torque not to exceed a limit value of lateral acceleration defined by a rule upon lane-centering assist control.

BACKGROUND

A lane-centering assist system may be a system for automatically controlling a steering system to drive on the center of a lane. The lane-centering assist system may ascertain a location in a lane of a vehicle using a sensor which recognizes the lane and may primarily calculate a demand steering angle necessary for maintaining the vehicle on the center of the lane. In this case, since a real physical value which causes a change in steering angle is torque, the lane-centering assist system may secondarily calculate steering torque in order to follow the demanded steering angle.

Although an automatically commanded steering function (ACSF) is executed, a driver is still under a steering control of a vehicle. In this regard, an ACSF rule of the United Nations Economic Commission for Europe (UNECE) sets and regulates a limit value in an amount of control by a system. The current rule regulates an acceleration, which may be generated by the system when a lane-centering assist function is executed, not being greater than a maximum of 3.0 m/s$^2$.

In the related art, if lateral acceleration is greater than 3.0 m/s$^2$ which are the limited value defined by the rule so that the steering control is released, a vehicle may suddenly deviate from a lane on a curve road. Thus, there is a need for technology for ensuring control performance while limiting an amount of control by the system to meet the rule.

SUMMARY

The present disclosure has been made to solve the above-mentioned problems occurring in the prior art while advantages achieved by the prior art are maintained intact.

An aspect of the present disclosure provides a lateral acceleration limiting device for gradually adjusting steering torque to perform lane-keeping control while lateral acceleration is not greater than a limit value defined by a rule, upon lane-centering assist control of a vehicle, a system including the same, and a method therefor.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a lateral acceleration limiting device may include: a processor configured to calculate current lateral acceleration of a vehicle, predict forward lateral acceleration, and determine whether the predicted prediction lateral acceleration and the current lateral acceleration are greater than a predetermine reference value, a controller communicatively connected to the processor and configured to determine whether to generate a warning or whether to adjust steering torque, depending on the result determined by the processor, and a steering torque adjusting device communicatively connected to the controller and configured to adjust the steering torque depending on control of the controller.

In an embodiment, the device may further include a warning device communicatively connected to the controller and configured to provide a warning depending on control of the controller.

In an embodiment, the device may further include a storage configured to store at least one or more of the prediction lateral acceleration, the current lateral acceleration, or the steering torque.

In an embodiment, the processor may be configured to estimate maximum curvature of a road before a road where the vehicle is being driven, calculate the prediction lateral acceleration using the forward maximum curvature, calculate the current lateral acceleration based on a current yaw rate of the vehicle, and determine whether the prediction lateral acceleration or the current lateral acceleration is greater than the predetermined reference value.

In an embodiment, the processor may be further configured to calculate current curvature of the road where the vehicle is being driven, using information about a longitudinal distance and curvature of a current location including a global positioning system (GPS) time delay received from a navigation device and calculate forward prediction curvature of a road at a point after the vehicle is driven during a predetermined time, using information about a longitudinal direction and curvature after the vehicle is driven during the predetermined time.

In an embodiment, the processor may be further configured to estimate information about curvature having a maximum value among a plurality of curvature calculated from a current location of the vehicle to a point after the vehicle is driven during the predetermined time as maximum curvature information.

In an embodiment, processor may be further configured to calculate the prediction lateral acceleration by multiplying the forward maximum curvature by a vehicle speed.

In an embodiment, the processor may be further configured to calculate the current lateral acceleration by multiplying the yaw rate by a vehicle speed.

In an embodiment, the processor may be further configured to determine whether the prediction lateral acceleration or the current lateral acceleration is greater than maximum lateral acceleration defined by a rule.

In an embodiment, the controller may be configured to, if at least one of the prediction acceleration or the current lateral acceleration is greater than the predetermined reference value, determine whether a driver is in a hands-off state and, if the driver is in the hands-off state, control the warning device to output a warning to the driver.

In an embodiment, wherein the controller may be further configured to, after determining that the current lateral acceleration is greater than the predetermined reference value, determine whether an excess flag is "1", if the excess flag is not "1", determine whether the current lateral acceleration is greater than a first limit value, if the current lateral acceleration is greater than the first limit value, control the steering torque in the direction of reducing the steering torque and maintain the excess flag as "1", and, if the current lateral acceleration is not greater than the first limit value, set the steering torque to "0" and change the excess flag to "0".

In an embodiment, the controller may be further configured to, if the excess flag is "1", determine whether the current lateral acceleration is greater than a second limit value which is less than the first limit value, if the current lateral acceleration is greater than the second limit value, control the steering torque in the direction of reducing the steering torque and maintain the excess flag as "1", and, if the current lateral acceleration is not greater than the second limit value, set the steering torque to "0" and change the excess flag to "0".

According to another aspect of the present disclosure, a lateral acceleration limiting system may include: a lateral acceleration limiting device including a processor configured to calculate current lateral acceleration based on a yaw rate of a vehicle, predict forward lateral acceleration based on information about curvature of a road before a road where a vehicle is being driven, and determine whether the predicted prediction lateral acceleration and the current lateral acceleration are greater than a predetermined reference value, and a warning device configured to output a warning or adjust steering torque, depending on a result determined by the processor. The lateral acceleration limiting system may further include a navigation device communicatively connected to the processor and configured to provide the information about the curvature of the road before the road, and a yaw rate sensor communicatively connected to the processor and configured to provide the yaw rate.

In an embodiment, the lateral acceleration limiting device may include a controller communicatively connected to the processor and configured to determine whether to generate the warning or whether to adjust the steering torque, depending on the result determined by the processor, and a steering torque adjusting device configured to adjust the steering torque depending on control of the controller.

According to another aspect of the present disclosure, a lateral acceleration limiting method may include steps of: calculating current lateral acceleration based on a yaw rate of a vehicle, predicting forward lateral acceleration based on information about curvature of a road before a road where a vehicle is being driven, determining whether the predicted prediction lateral acceleration and the current lateral acceleration are greater than a predetermine reference value, and outputting a warning or adjusting steering torque, depending on a result of the step of determining.

In an embodiment, the step of predicting forward lateral acceleration may include calculating current curvature of the road where the vehicle is being driven, using information about a longitudinal distance and curvature of a current location including a GPS time delay received from a navigation device, calculating forward prediction curvature of a road at a point after the vehicle is driven during a predetermined time, using information about a longitudinal direction and curvature after the vehicle is driven during the predetermined time, and estimating information about curvature having a maximum value among a plurality of curvature calculated from a current location of the vehicle to a point after the vehicle is driven during the predetermined time as maximum curvature information.

In an embodiment, the step of predicting forward lateral acceleration may include calculating the prediction lateral acceleration by multiplying the forward maximum curvature by a vehicle speed.

In an embodiment, the step of outputting a warning or adjusting steering torque may include, if at least one of the prediction acceleration or the current lateral acceleration is greater than the predetermined reference value, determining whether a driver is in a hands-off state and, if the driver is in the hands-off state, controlling the warning device to output a warning to the driver.

In an embodiment, the step of outputting a warning or adjusting steering torque may include, after determining that the current lateral acceleration is greater than the predetermined reference value, determining whether an excess flag is "1", if the excess flag is not "1", determining whether the current lateral acceleration is greater than a first limit value, if the current lateral acceleration is greater than the first limit value, control the steering torque in the direction of reducing the steering torque and maintaining the excess flag as "1", and, if the current lateral acceleration is not greater than the first limit value, setting the steering torque to "0" and changing the excess flag to "0".

In an embodiment, the step of outputting a warning or adjusting steering torque may include, if the excess flag is "1", determining whether the current lateral acceleration is greater than a second limit value which is less than the first limit value, if the current lateral acceleration is greater than the second limit value, control the steering torque in the direction of reducing the steering torque and maintaining the excess flag as "1", and, if the current lateral acceleration is not greater than the second limit value, setting the steering torque to "0" and changing the excess flag to "0".

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$ first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An embodiment of the present disclosure may disclose technology of predicting lateral acceleration in advance based on curvature information received from a navigation device, calculating current lateral acceleration based on a yaw rate through a yaw rate sensor, and checking whether the predicted prediction lateral acceleration and the current lateral acceleration are greater than a limit value. The embodiment of the present disclosure may disclose technology of performing safe driving by adjusting steering torque if the prediction lateral acceleration and the current lateral acceleration are greater than the limit value to perform lane-centering driving while the lateral acceleration is not greater than the limit value.

Hereinafter, a description will be given in detail of embodiments of the present disclosure with reference to FIGS. 1 to 9.

Figure 1:
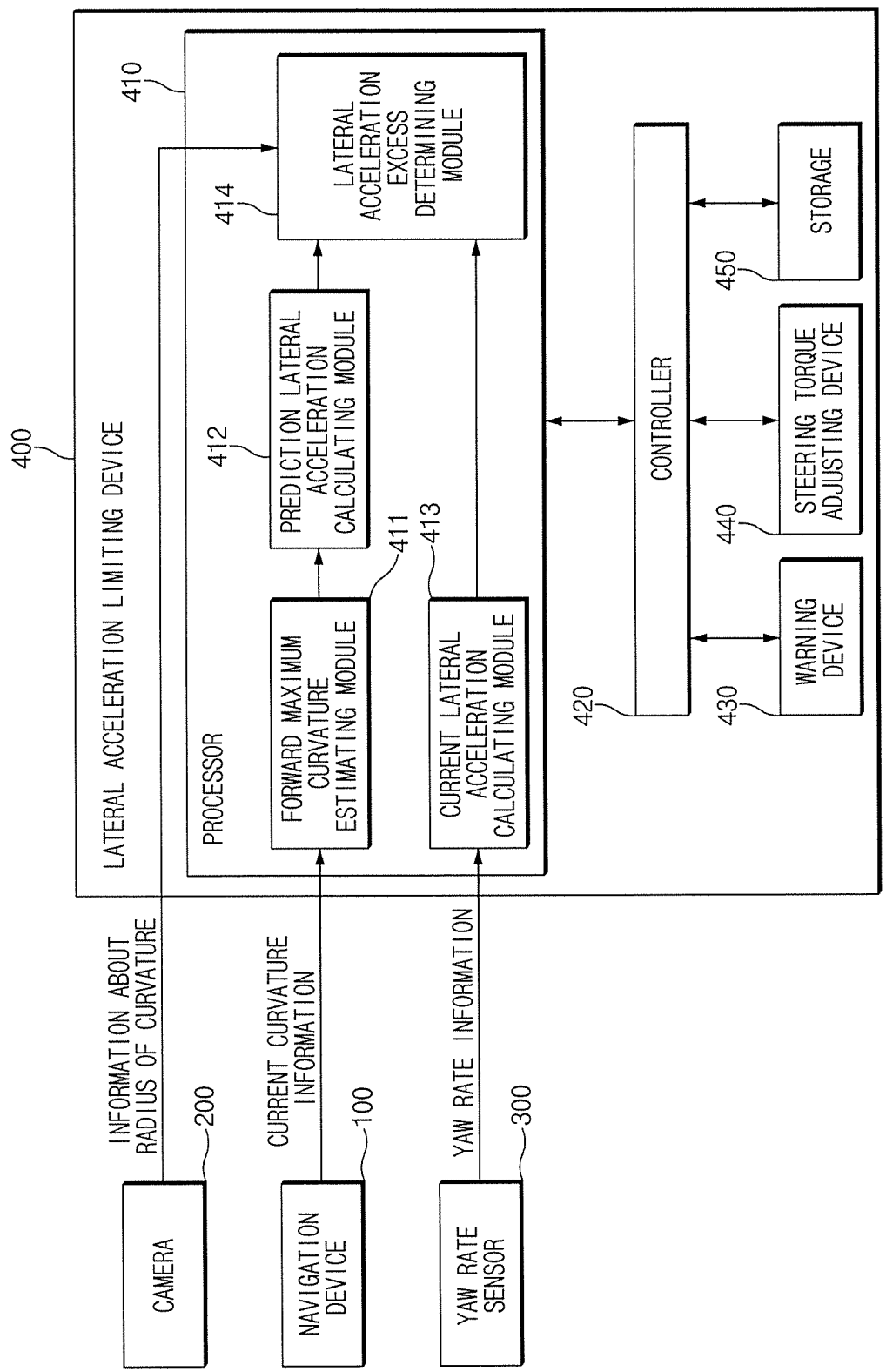
FIG. 1 is a block diagram illustrating a configuration of a lateral acceleration limiting system according to an embodiment of the present disclosure.
Figure 2:
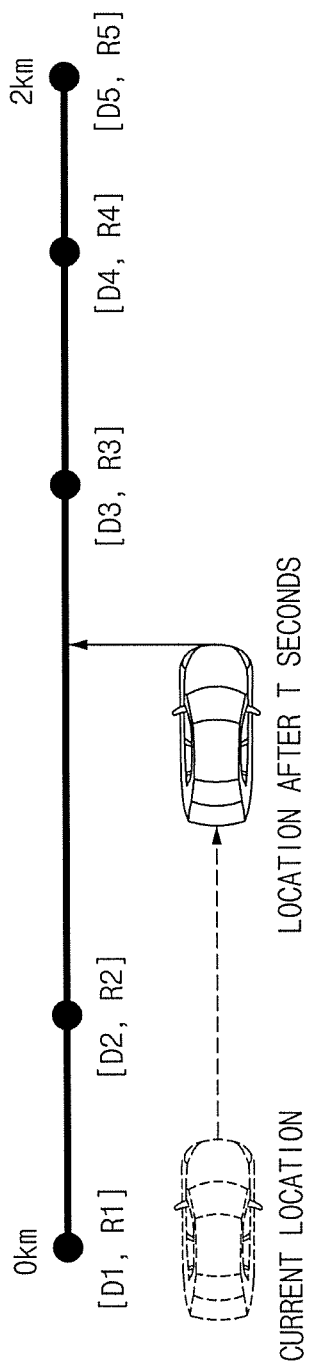
FIG. 2 is a drawing illustrating a curvature estimation method using information received from a navigation device according to an embodiment of the present disclosure.

FIG. 1 is a block diagram illustrating a configuration of a lateral acceleration limiting system according to an embodiment of the present disclosure. FIG. 2 is a drawing illustrating a curvature estimation method using information received from a navigation device according to an embodiment of the present disclosure. The lateral acceleration limiting system of the FIG. 1 may be implemented to be integrated with a lane-centering assist device.

Referring to FIG. 1, the lateral acceleration limiting system may include a navigation device 100, a camera 200, a yaw rate sensor 300, and a lateral acceleration limiting device 400.

The navigation device 100 may generate and guide a driving path of a vehicle through map information, a global positioning system (GPS) signal, or the like and may provide information about a longitudinal distance of a road or a radius of curvature of the road to the lateral acceleration limiting device 400 through the map information.

The camera 200 may capture an image of the front of the vehicle and may transmit image data including information about a radius of curvature of the road to the lateral acceleration limiting device 400.

The yaw rate sensor 300 may sense a yaw rate of the vehicle and may provide the sensed yaw rate information to the lateral acceleration limiting device 400.

The lateral acceleration limiting device 400 may calculate current lateral acceleration based on the yaw rate of the vehicle, may predict forward lateral acceleration based on information about curvature of a road before a road where the vehicle is being driven, and may determine whether the predicted prediction lateral acceleration and the current lateral acceleration are greater than a predetermined reference value, thus outputting a warning or adjusting steering torque depending on the determined result.

For this purpose, the lateral acceleration limiting device 400 may include a processor 410, a controller 420, a warning device 430, a steering torque adjusting device 440, and a storage 450.

The processor 410 may calculate current lateral acceleration based on a yaw rate of the vehicle and may predict forward lateral acceleration based on information about curvature of a road before a road where the vehicle is being driven, thus determining whether the predicted prediction lateral acceleration and the current lateral acceleration are greater than a predetermined reference value.

For this purpose, the processor 410 may have an associated non-transitory memory storing software instructions which, when executed by the processor 410, provide the functionalities of a forward maximum curvature estimating module 411, a prediction lateral acceleration calculating module 412, a current lateral acceleration calculating module 413, and a lateral acceleration excess determining module 414. The processor 410 may take the form of one or more processor(s) and associated memory storing program instructions which provide the functionalities of the above modules 411, 412, 413, and 414.

The forward maximum curvature estimating module 411 of the processor 410 may estimate maximum curvature of the road before the road where the vehicle is being driven. The forward maximum curvature estimating module 411 may calculate current curvature of the road where the vehicle is being driven, using information about a longitudinal distance and curvature of a current location including a GPS time delay received from the navigation device 100. Further, the forward maximum curvature estimating module 411 may receive and use information about curvature captured by the camera 200.

The forward maximum curvature estimating module 411 may calculate forward prediction curvature of a road at a point after the vehicle is driven during a predetermined time, using information about a longitudinal distance and curvature after the vehicle is driven during the predetermined time. The forward maximum curvature estimating module 411 may estimate information about curvature having a maximum value among a plurality of curvature calculated from a current location of the vehicle to a point after the vehicle is driven during the predetermined time as maximum curvature information.

Equation 1 below is a formula for calculating a vehicle current longitudinal current $D_{cur}$ considering a GPS delay. Equation 2 is a formula for calculating a vehicle current longitudinal location $D_{off}$ without regard to a GPS delay.

$$D_{cur} = D_{off} + V \times t_{delay} \quad \text{[Equation 1]}$$

Herein, $D_{cur}$ may refer to the vehicle current longitudinal location considering the GPS delay, $D_{off}$ may refer to the vehicle current longitudinal location without regard to the GPS delay, V may refer to a vehicle speed, and $t_{delay}$ may refer to a GPS time delay.

$$D_{off} = D_{off} + V \times t_{sampling} \quad \text{[Equation 2]}$$

Herein, $t_{sampling}$ may refer to a logic arithmetic period.

$$\rho_{cur} = \frac{1}{R_{i-1}} + \frac{1/R_i - 1/R_{i-1}}{D_i - D_{i-1}} \times (D_{cur} - D_{i-1}) \quad \text{[Equation 3]}$$

Herein, $\rho_{cur}$ may refer to current curvature of the road where the vehicle is being driven, R may refer to a radius of curvature, and D may refer to a longitudinal distance. In this case, information about the radius of curvature and the longitudinal distance may be received from the navigation device 100. Referring to FIG. 2, it may be seen that information about a longitudinal distance and a radius of curvature is displayed. Referring to FIG. 2, it may be seen that a current location of a vehicle and a location after t seconds are displayed. In this case, only if a difference of 50 m occurs, a radius of curvature may be represented as a value in arrangement. The forward maximum curvature estimating module 411 may estimate current location curvature using a method for interpolating arrangement values.

$$D_{pre} = D_{cur} + V \times t \quad \text{[Equation 4]}$$

Herein, $D_{pre}$ may refer to a forward prediction longitudinal location.

$$\rho_{pre} = \frac{1}{R_{i-1}} + \frac{1/R_i - 1/R_{i-1}}{D_i - D_{i-1}} \times (D_{pre} - D_{i-1}) \quad \text{[Equation 5]}$$

Herein, $\rho_{pre}$ may refer to forward prediction curvature, R may refer to a radius of curvature, and D may refer to a longitudinal distance. Referring to FIG. 2, the forward maximum curvature estimating module 411 may predict information about a longitudinal distance and curvature of a location after t seconds 2 kilometers ahead of the vehicle.

$$\rho_{max} = \max(\rho_{cur}, \rho i_{min}, \rho i_{min+1}, \ldots \rho i_{max}, \rho_{pre}) \quad \text{[Equation 6]}$$

Herein, $\rho_{max}$ may refer to information about forward maximum curvature.

The forward maximum curvature estimating module 411 may calculate current curvature of the road using Equation 3, may calculate forward prediction curvature using Equation 5, and may estimate information about maximum curvature between a source and a point after t seconds like Equation 6.

The prediction lateral acceleration calculating module 412 of the processor 410 may calculate prediction lateral acceleration by multiplying forward maximum curvature by a vehicle speed like Equation 7.

$$|a_{pre}| = |\times V^2 \quad \text{[Equation 7]}$$

The current lateral acceleration calculating module 413 of the processor 410 may calculate current lateral acceleration by multiplying a current yaw rate Y of the vehicle by a vehicle speed V like Equation 8. The current lateral acceleration calculating module 413 may calculate the current lateral acceleration by multiplying a yaw rate Y by a vehicle speed V.

$$|a_{cur}| = |\gamma| \times V \quad \text{[Equation 8]}$$

The lateral acceleration excess determining module 414 of the processor 410 may determine whether the prediction lateral acceleration $a_{pre}$ or the current lateral acceleration $a_{cur}$ is greater than a predetermined reference value. In this case, the predetermined reference value may mean maximum lateral acceleration (a limit value) defined by a rule. In an embodiment of the present disclosure, the lateral acceleration excess determining module 414 may determine whether the prediction lateral acceleration $a_{pre}$ or the current lateral acceleration $a_{cur}$ is greater than the predetermined reference value by reflecting a first margin $a_{mar1}$ like Equations 9 and 10 below.

if $(|a_{pre}| \geq |a_{max}| - |a_{mar1}|)$

Flag_$a_{pre}$=1;

elseFlag_$a_{pre}$=0; [Equation 9]

Herein, $a_{max}$ may refer to maximum lateral acceleration defined by the rule, $a_{mar1}$ may refer to a first margin, and Flag_$a_{pre}$ may refer to a flag indicating whether prediction lateral acceleration is greater than the maximum lateral acceleration.

if $(|a_{cur}| \geq |a_{max}| - |a_{mar1}|)$

Flag_$a_{cur}$=1;

elseFlag_$a_{cur}$=0; [Equation 9]

Herein, Flag_$a_{cur}$ may refer to a flag indicating whether current lateral acceleration is greater than the maximum lateral acceleration.

In other words, if the prediction lateral acceleration $a_{pre}$ is greater than a value obtained by subtracting the first margin $a_{mar1}$ from the maximum lateral acceleration $a_{max}$, the flag Flag_$a_{pre}$ indicating whether the lateral acceleration is greater than the maximum lateral acceleration may be "1". If the prediction lateral acceleration $a_{pre}$ is less than the value, the flag Flag_$a_{pre}$ may be "0". Further, if the current lateral acceleration $a_{cur}$ is greater than a value obtained by subtracting the first margin $a_{mar1}$ from the maximum lateral acceleration $a_{max}$, the flag Flag_$a_{cur}$ indicating whether the current lateral acceleration is greater than the maximum lateral acceleration may be "1". If the current lateral acceleration $a_{cur}$ is less than the value, the flag Flag_$a_{cur}$ may be "0".

The controller 420 is an electric circuitry that executes instructions of software which thereby performs various functions described hereinafter.

The controller 420 may determine whether to generate a warning or whether to adjust steering torque, depending on the result determined by the processor 410. In other words, if at least one of the prediction lateral acceleration or the current lateral acceleration is greater than a predetermined reference value, the controller 420 may determine whether a driver is in a hands-off state. If the driver is in the hands-off state, the controller 420 may control the warning device 430 to output a warning to the driver. In this case, the hands-off state may be a state where the driver does not hold a steering wheel and may mean a state whether he or she does not pay attention to driving.

Further, if determining that the current lateral acceleration is greater than the predetermined reference value, the controller 420 may determine whether excess flag is "1". If the excess flag is not "1", the controller 420 may determine whether the current lateral acceleration is greater than a first limit value. If the current lateral acceleration is greater than the first limit value, the controller 420 may control steering torque in the direction of reducing the steering torque and may maintain the excess flag as "1". Further, if the current lateral acceleration is not greater than the first limit value, the controller 420 may set the steering torque to "0" and may change the excess flag to "0". Further, if the excess flag is "1", the controller 420 may determine whether the current lateral acceleration is greater than a second limit value which is lower than the first limit value. If the current lateral acceleration is greater than the second limit value, the controller 420 may control the steering torque in the direction of reducing the steering torque and may maintain the excess flag as "1". Further, if the current lateral acceleration is not greater than the second limit value, the controller 420 may set the steering torque to "0" and may change the excess flag to "0".

The warning device 430 may provide a warning to the driver depending on control of the controller 420. The warning device 430 may warn the driver through warning text, a warning voice, a warning sound, vibration, or the like.

The steering torque adjusting device 440 may adjust steering torque based on control of the controller 420.

The storage 450 may store at least one or more of the calculated prediction lateral acceleration, the calculated lateral acceleration, or the steering torque.

An embodiment of the present disclosure having such configuration may predict lateral acceleration in advance based on curvature information received from the navigation device 100 and may calculate current lateral acceleration based on a yaw rate through the yaw rate sensor 300, thus checking whether the prediction lateral acceleration and the current lateral acceleration are greater than a limit value. If the prediction lateral acceleration and the current lateral acceleration are greater than the limit value, the embodiment of the present disclosure may perform lane-centering driving while lateral acceleration is not greater than the limit value by adjusting steering torque.

Figure 3:
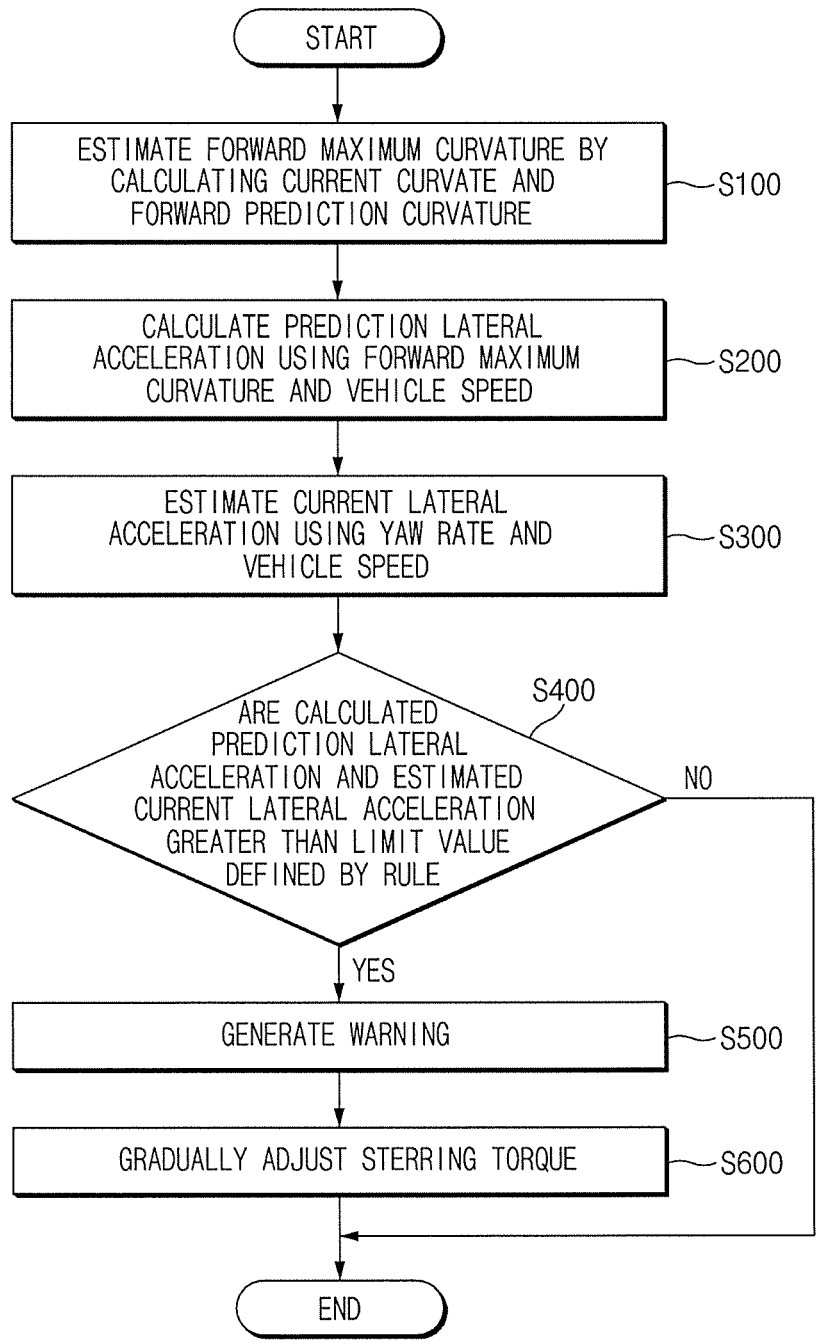
FIG. 3 is a flowchart illustrating a lateral acceleration limiting method according to an embodiment of the present disclosure.

Hereinafter, a description will be given in detail of a lateral acceleration limiting method according to an embodiment of the present disclosure with reference to FIG. 3. FIG. 3 is a flowchart illustrating a lateral acceleration limiting method according to an embodiment of the present disclosure.

Referring to FIG. 3, in operation S100, a lateral acceleration limiting device 400 of FIG. 1 according to an embodiment of the present disclosure may estimate forward maximum curvature $\rho_{max}$ by calculating current curvature $\rho_{cur}$ and forward prediction curvature $\rho_{pre}$.

In operation S200, the lateral acceleration limiting device 400 may calculate prediction lateral acceleration $a_{pre}$ using the forward maximum curvature $\rho_{max}$ and a vehicle speed.

In operation S300, the lateral acceleration limiting device 400 may estimate current lateral acceleration $a_{cur}$ using a yaw rate received from a yaw rate sensor 300 of FIG. 1 and the vehicle speed.

Further, in operation S400, the lateral acceleration limiting device 400 may determine whether the estimated current lateral acceleration $a_{cur}$ or the calculated prediction lateral acceleration $a_{pre}$ is greater than a limit value defined by a rule. If the current lateral acceleration $a_{cur}$ or the prediction lateral acceleration $a_{pre}$ is greater than the limit value, in operation S500, the lateral acceleration limiting device 400 generates a warning to a driver.

Further, in operation S600, the lateral acceleration limiting device 400 may gradually adjust steering torque based on the current lateral acceleration $a_{cur}$, thus continuing performing lane-centering control while lateral acceleration is not greater than the limit value defined by the rule.

Figure 4:
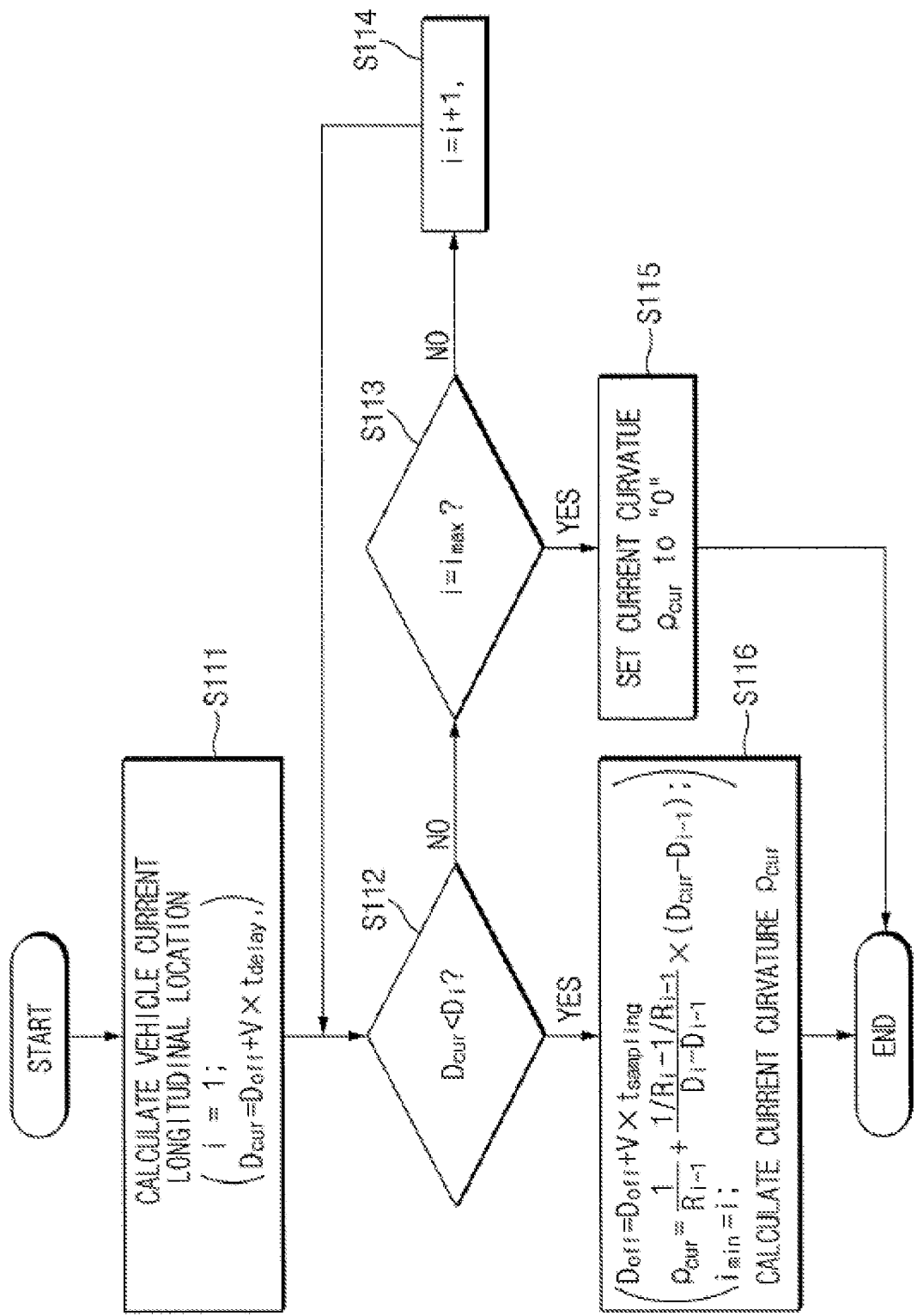
FIG. 4 is a flowchart illustrating a method for calculating current curvature according to an embodiment of the present disclosure.

A description will be given in detail of a method for calculating current curvature according to an embodiment of the present disclosure with reference to FIG. 4. FIG. 4 is a flowchart illustrating a method for calculating current curvature according to an embodiment of the present disclosure.

Referring to FIG. 4, when i is one, in operation S111, a lateral acceleration limiting device 400 of FIG. 1 may calculate a vehicle current longitudinal location $D_{cur}$ using Equation 1 above in consideration of a vehicle current longitudinal location $D_{off}$ without regard to a GPS delay, a vehicle speed, and a GPS time delay $t_{delay}$.

In operation S112, the lateral acceleration limiting device 400 may determine whether the calculated vehicle current longitudinal location $D_{cur}$ is less than a longitudinal distance $D_i$. If the calculated vehicle current longitudinal location $D_{cur}$ is not less than the longitudinal distance $D_i$, in operation S113, the lateral acceleration limiting device 400 may determine whether i is a maximum value. If i is not the maximum value, in operation S114, the lateral acceleration limiting device 400 may add i to 1 and may return to operation S112. Meanwhile, if i is the maximum value, in operation S115, the lateral acceleration limiting device 400 may set current curvature $\rho_{cur}$ to "0".

Meanwhile, if the vehicle current longitudinal location $D_{cur}$ is not less than the longitudinal distance $D_i$ in operation S112, in operation S116, the lateral acceleration limiting device 400 may calculate a vehicle current longitudinal location $D_{off}$ without regard to a GPS delay and current curvature $\rho_{cur}$ like Equations 2 and 3 above.

Figure 5:
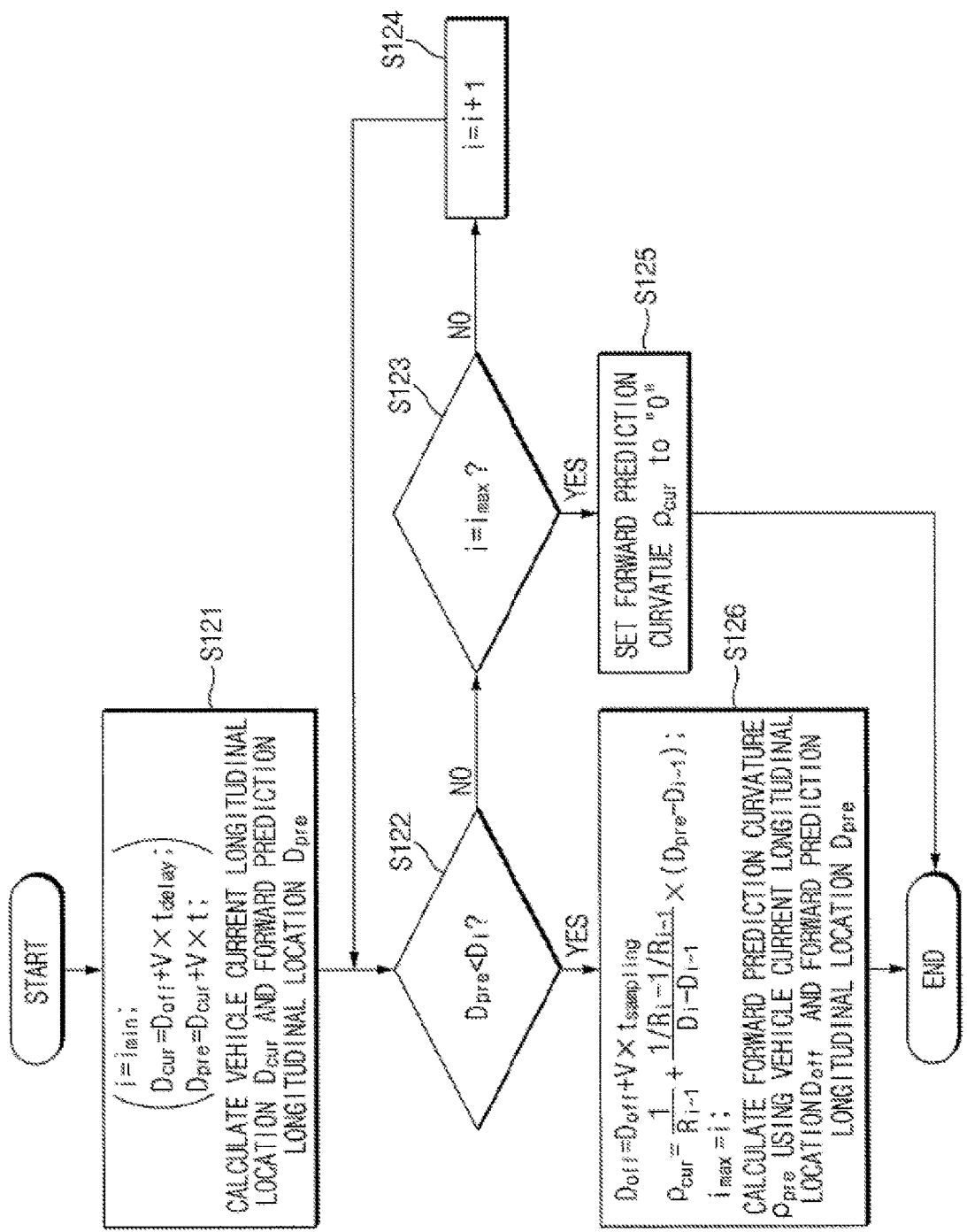
FIG. 5 is a flowchart illustrating a method for calculating forward prediction curvature according to an embodiment of the present disclosure.

A description will be given in detail of a method for calculating forward prediction curvature according to an embodiment of the present disclosure with reference to FIG. 5. FIG. 5 is a flowchart illustrating a method for calculating forward prediction curvature according to an embodiment of the present disclosure.

Referring to FIG. 5, when i is one, in operation S121, a lateral acceleration limiting device 400 of FIG. 1 may calculate a vehicle current longitudinal location $D_{cur}$ using Equation 1 above in consideration of a vehicle current longitudinal location $D_{off}$ without regard to a GPS delay, a vehicle speed, and a GPS time delay $t_{delay}$ and may calculate a forward prediction longitudinal location $D_{pre}$ using the vehicle current longitudinal location $D_{cur}$ like Equation 4 above.

In operation S122, the lateral acceleration limiting device 400 may determine whether the calculated forward prediction longitudinal location $D_{pre}$ is less than a longitudinal distance $D_i$. If the calculated forward prediction longitudinal location $D_{pre}$ is not less than the longitudinal distance $D_i$, in operation S123, the lateral acceleration limiting device 400 may determine whether i is a maximum value. If i is not the maximum value, in operation S124, the lateral acceleration limiting device 400 may add i to "1" and may return to operation S212. Meanwhile, if i is the maximum value, in operation S125, the lateral acceleration limiting device 400 may set forward prediction curvature $\rho_{pre}$ to "0".

Meanwhile, if the vehicle forward prediction longitudinal location $D_{pre}$ is not less than the longitudinal distance $D_i$ in operation S122, in operation S126, the lateral acceleration limiting device 400 may calculate vehicle a current longitudinal location $D_{off}$ without regard to a GPS delay and forward prediction curvature $\rho_p$, like Equations 2 and 5 above.

Figure 6:
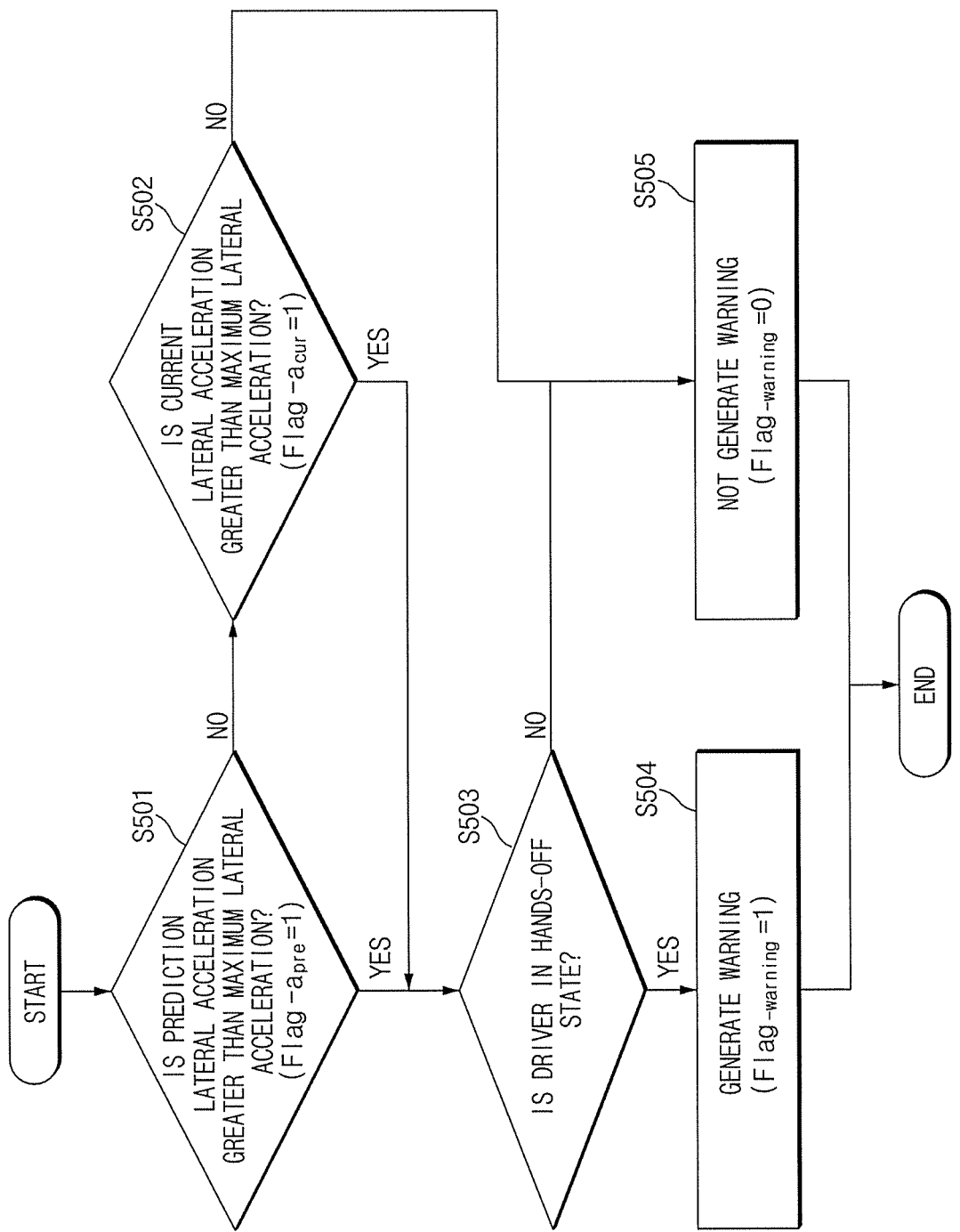
FIG. 6 is a flowchart illustrating a warning method based on determining whether lateral acceleration is greater than maximum lateral acceleration, according to an embodiment of the present disclosure.

A description will be given in detail of a warning method based on determining whether lateral acceleration is greater than maximum lateral acceleration, according to an embodiment of the present disclosure with reference to FIG. 6. FIG. 6 is a flowchart illustrating a warning method based on determining whether lateral acceleration is greater than maximum lateral acceleration, according to an embodiment of the present disclosure.

Referring to FIG. 6, after prediction lateral acceleration predicated based on curvature is greater than maximum lateral acceleration, in operation S501, a lateral acceleration limiting device 400 of FIG. 1 may determine whether a flag Flag_$a_{pre}$ indicating whether the prediction lateral acceleration is greater than the maximum lateral acceleration is "1".

If the flag Flag_$a_{pre}$ indicating whether the prediction lateral acceleration is greater than the maximum lateral acceleration is in operation S503, the lateral acceleration limiting device 400 may determine whether a driver is in a hands-off state, that is, whether he or she does not hold a steering wheel. In operation S504, if the driver is in the hands-off state, the lateral acceleration limiting device 400 may generate a warning to the driver.

Meanwhile, if the flag Flag_$a_{pre}$ indicating whether the prediction lateral acceleration is greater than the maximum lateral acceleration is not "1", in operation S502, the lateral acceleration limiting device 400 may determine whether current lateral acceleration is greater than a limit value, that is, whether a flag Flag_$a_{cur}$ indicating whether the current lateral acceleration is greater than the maximum lateral acceleration is "1".

If the flag Flag_$a_{cur}$ indicating whether the current lateral acceleration is greater than the maximum lateral acceleration is in operation S503, the lateral acceleration limiting device 400 may determine whether the driver is in the hands-off state, that is, whether he or she does not hold the steering wheel. If the driver is in the hands-off state, in operation S504, the lateral acceleration limiting device 400 may generate the warning to the driver.

On the other hand, if the driver is not in the hands-off state and if the flag Flag_$a_{cur}$ indicating whether the current lateral acceleration is greater than the maximum lateral acceleration is not "1", in operation S505, the lateral acceleration limiting device 400 may fail to generate the warning.

In FIG. 6, if the reception of a GPS signal of a navigation device 100 of FIG. 1 is unstable or if acceleration which has an influence on a vehicle is higher than prediction lateral acceleration, since lateral acceleration is greater than the maximum lateral acceleration, the present disclosure may disclose an example of generating a warning if current lateral acceleration of the vehicle is greater than a limit value although the prediction lateral acceleration is not greater than the limit value.

Figure 7:
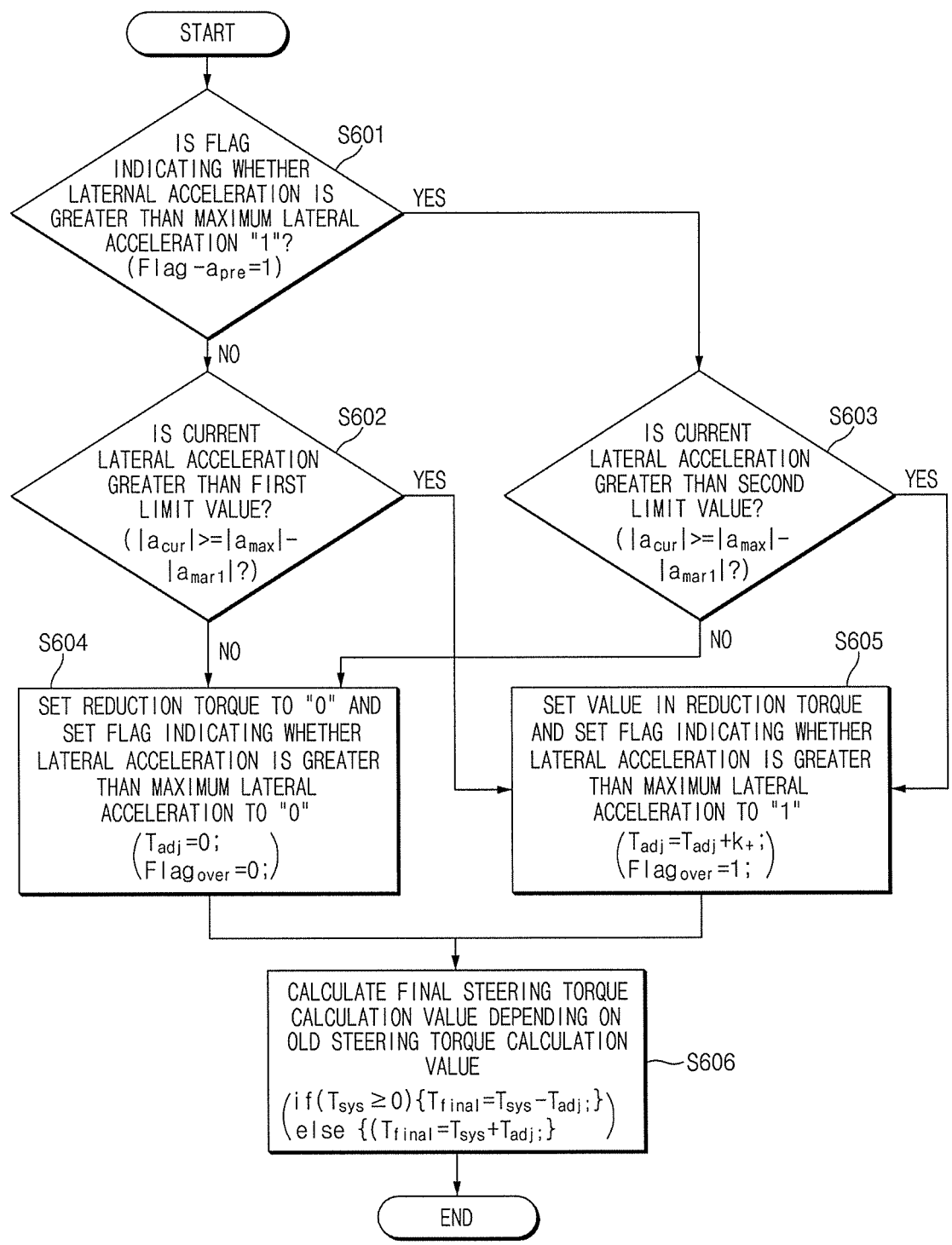
FIG. 7 is a flowchart illustrating a method for adjusting steering torque based on whether lateral acceleration is greater than maximum lateral acceleration, according to an embodiment of the present disclosure.

A description will be given in detail of a method for adjusting steering torque based on whether lateral acceleration is greater than the maximum lateral acceleration, according to an embodiment of the present disclosure. FIG. 7 is a flowchart illustrating a method for adjusting steering torque based on whether lateral acceleration is greater than maximum lateral acceleration, according to an embodiment of the present disclosure.

Referring to FIG. 7, in operation S601, a lateral acceleration limiting device 400 may determine whether a flag Flag over indicating whether lateral acceleration is greater than the maximum lateral acceleration is "1".

If the flag Flag_$over$ indicating whether the lateral acceleration is greater than the maximum lateral acceleration is not "1", in operation S602, the lateral acceleration limiting device 400 may determine whether current lateral acceleration $a_{cur}$ is greater than a first limit value. In this case, the first limit value may be a value obtained by subtracting a first margin $a_{mar1}$ from maximum lateral acceleration $a_{max}$ defined by a rule.

If the current lateral acceleration $a_{cur}$ is not greater than the first limit value, in operation S604, the lateral acceleration limiting device 400 may set reduction torque $T_{adj}$ for reducing steering torque to "0" and may set the flag Flag_$over$ indicating whether the lateral acceleration is greater than the maximum lateral acceleration to "0".

Meanwhile, if the current lateral acceleration $a_{cur}$ is greater than the first limit value, in operation S605, the lateral acceleration limiting device 400 may set a value in the reduction torque for reducing the steering torque to increase by k and may set the flag Flag_$over$ indicating whether the lateral acceleration is greater than the maximum lateral acceleration to "1".

If the flag Flag_$over$ indicating whether the lateral acceleration is greater than the maximum lateral acceleration is in operation S601, in operation S603, the lateral acceleration limiting device 400 may determine whether the current lateral acceleration $a_{cur}$ is greater than a second limit value. Herein, the second limit value may be a value obtained by subtracting a second margin $a_{mar2}$ from the maximum lateral acceleration $a_{max}$ defined by the rule. In this case, the first margin $a_{mar1}$ may be set to be less than the second margin $a_{mar2}$.

Thereafter, if the current lateral acceleration $a_{cur}$ is not greater than the second limit value, in operation S604, the lateral acceleration limiting device 400 may set the reduction torque $T_{adj}$ for reducing the steering torque to "0" and may set the flag Flag_$over$ indicating whether the lateral acceleration is greater than the maximum lateral acceleration to "0".

Meanwhile, if the current lateral acceleration $a_{cur}$ is greater than the second limit value, in operation S605, the lateral acceleration limiting device 400 may set the value in the reduction torque $T_{adj}$ for reducing the steering torque to increase by k and may set the flag Flag_$over$ indicating whether the lateral acceleration is greater than the maximum lateral acceleration to "1".

Thereafter, if an old steering torque calculation value $T_{sys}$ is greater than or equal to "0", . . . in operation S606, . . . in operation S606, the lateral acceleration limiting device 400 may determine a final steering torque calculation value $T_{final}$ by subtracting the reduction torque $T_{adj}$ from the old steering torque calculation value $T_{sys}$. If the old steering torque calculation value $T_{sys}$ is less than "0", in operation 606, the lateral acceleration limiting device 400 may determine the final steering torque calculation value $T_{final}$ by adding the reduction torque $T_{adj}$ to the old steering torque calculation value $T_{sys}$.

In the warning control method of FIG. 5, if one of the current lateral acceleration or the prediction lateral acceleration is greater than the reference value, the warning may be output. However, it may be seen that the steering torque adjustment in FIG. 6 is controlled based on the current lateral acceleration. This is to exclude prediction lateral acceleration for accurately adjusting steering torque and control steering torque based on current lateral acceleration currently calculated.

In FIG. 7, frequent torque adjustment near a limit value may be avoided by providing the first margin and the second margin and adjusting the limit value.

For example, when the first margin is 0.5 km/s$^2$ and when the second margin is 0.7 km/s$^2$, it is assumed that maximum lateral acceleration defined by the rule is 3.0 km/s² and that initial current lateral acceleration is 2.6 km/s².

If the flag Flag$_{over}$ indicating whether the lateral acceleration is greater than the maximum lateral acceleration is not "1" in operation S601 (if current lateral acceleration is not greater than a limit value), the lateral acceleration limiting device 400 may enter operation S602. In operation S602, the lateral acceleration limiting device 400 may determine whether the current lateral acceleration is greater than 2.5 km/s² (the first limit value) which is 3.0-0.5. In this case, since the initial current lateral acceleration (2.6 km/s²) is greater than 2.5 km/s², the lateral acceleration limiting device 400 may enter operation S605 to reduce steering torque. Thus, the lateral acceleration limiting device 400 may maintain the flag Flag$_{over}$ indicating whether the lateral acceleration is greater than the maximum lateral acceleration as "1" and may increase reduction torque to reduce the steering torque.

Assuming that the steering torque is reduced from 2.6 km/s² to 2.5 km/s², since the flag Flag$_{over}$ indicating whether the lateral acceleration is greater than the maximum lateral acceleration is "1", the lateral acceleration limiting device 400 may enter operation S603. In operation S603, the lateral acceleration limiting device 400 may determine whether the current lateral acceleration is greater than 2.3 km/s² (the second limit value) which is 3.0-0.7. In this case, since the current lateral acceleration is 2.5 km/s², it is greater than the second limit value (2.3 km/s²). Thus, the lateral acceleration limiting device 400 may enter operation S605 to further reduce the steering torque.

If the current lateral acceleration is less than the second limit value which is a warning cancellation value, since a current area is not an area which violates the rule, the lateral acceleration limiting device 400 may restore the steering torque to an original state to strengthen lane-keeping performance.

Figure 8A:
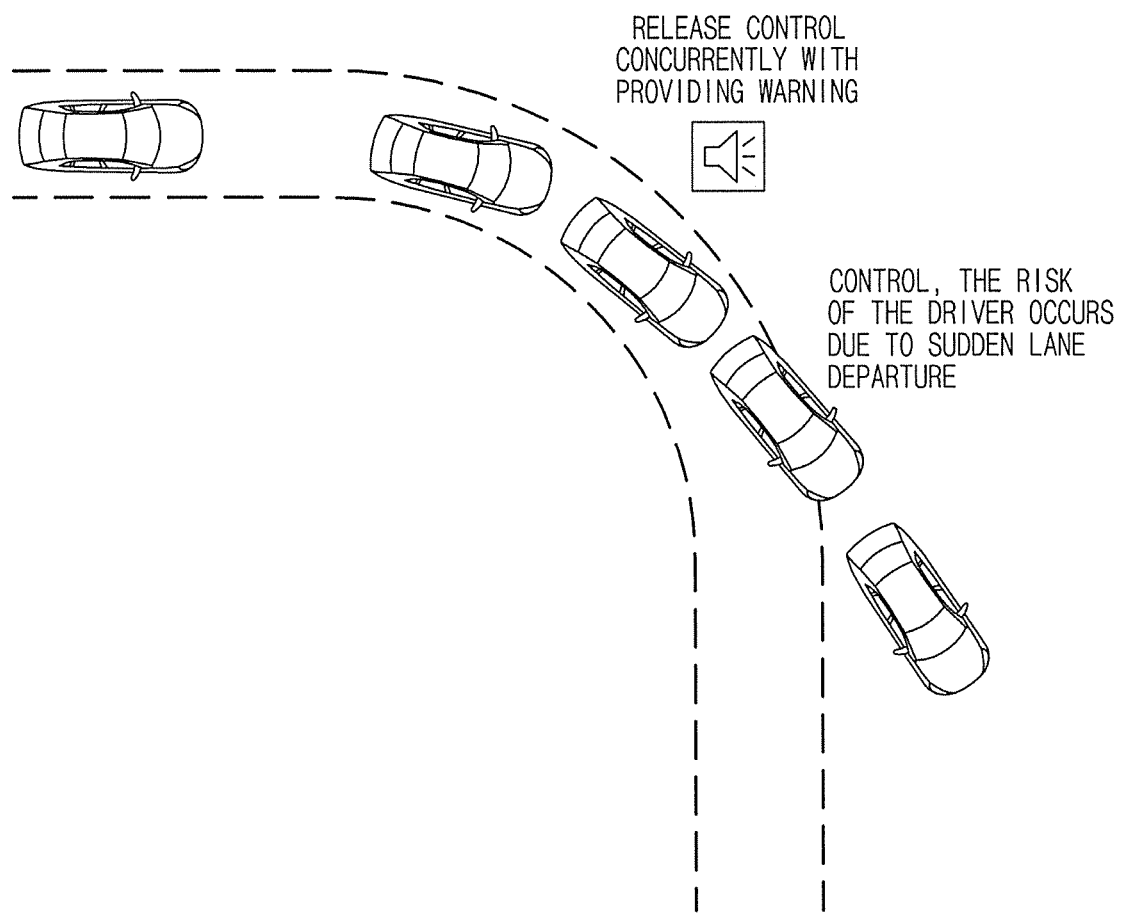
FIG. 8A is a drawing illustrating an example of releasing a lateral acceleration control mode concurrently with providing a warning when lateral acceleration is greater than maximum lateral acceleration.
Figure 8B:
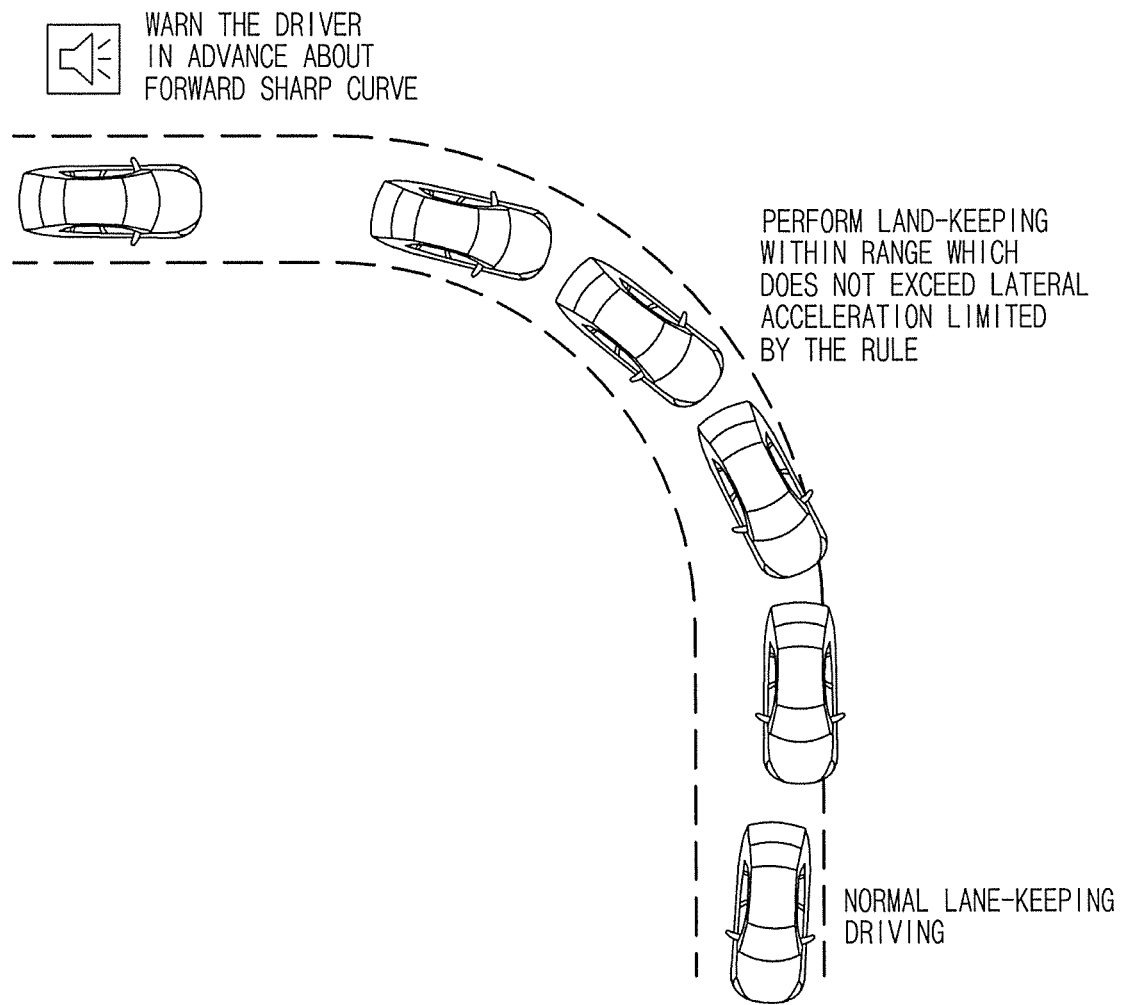
FIG. 8B is a drawing illustrating an example of performing lateral acceleration limitation control concurrently with providing a warning when lateral acceleration is greater than maximum lateral acceleration, according to an embodiment of the present disclosure.

FIG. 8A is a drawing illustrating an example of releasing a lateral acceleration control mode concurrently with providing a warning when lateral acceleration is greater than maximum lateral acceleration. FIG. 8B is a drawing illustrating an example of performing lateral acceleration limitation control concurrently with providing a warning when lateral acceleration is greater than maximum lateral acceleration, according to an embodiment of the present disclosure.

To prevent current lateral acceleration from being greater than a limit value defined by a rule, in the related art, as shown in FIG. 8A, a control mode of a lane-centering assist device may be suddenly released during curve driving. In such a case, a dangerous situation may occur while a vehicle suddenly deviates from a lane. In an embodiment of the present disclosure, as shown in FIG. 8B, steering torque may be adjusted to keep a lane while lateral acceleration is not greater than a limit value.

As such, an embodiment of the present disclosure may predict forward lateral acceleration based on curvature information received from a navigation device and may calculate current lateral acceleration based on a yaw rate. If one of the predicted forward lateral acceleration and the current lateral acceleration is greater than a limit value, the embodiment of the present disclosure may provide a warning for informing a driver of a risk. If there is a sharp curve predicted that the forward lateral acceleration is greater than the maximum lateral acceleration, the embodiment of the present disclosure may warn the driver of the sharp curve to allow the driver to have time to cope with the sharp curve and may guide the driver to drive safely.

Further, an embodiment of the present disclosure may adjust steering torque depending on current lateral acceleration and may enhance lane-keeping performance while stably maintaining control within a range which is not greater than lateral acceleration limited by the rule when performing lane-centering assist function.

Figure 9:
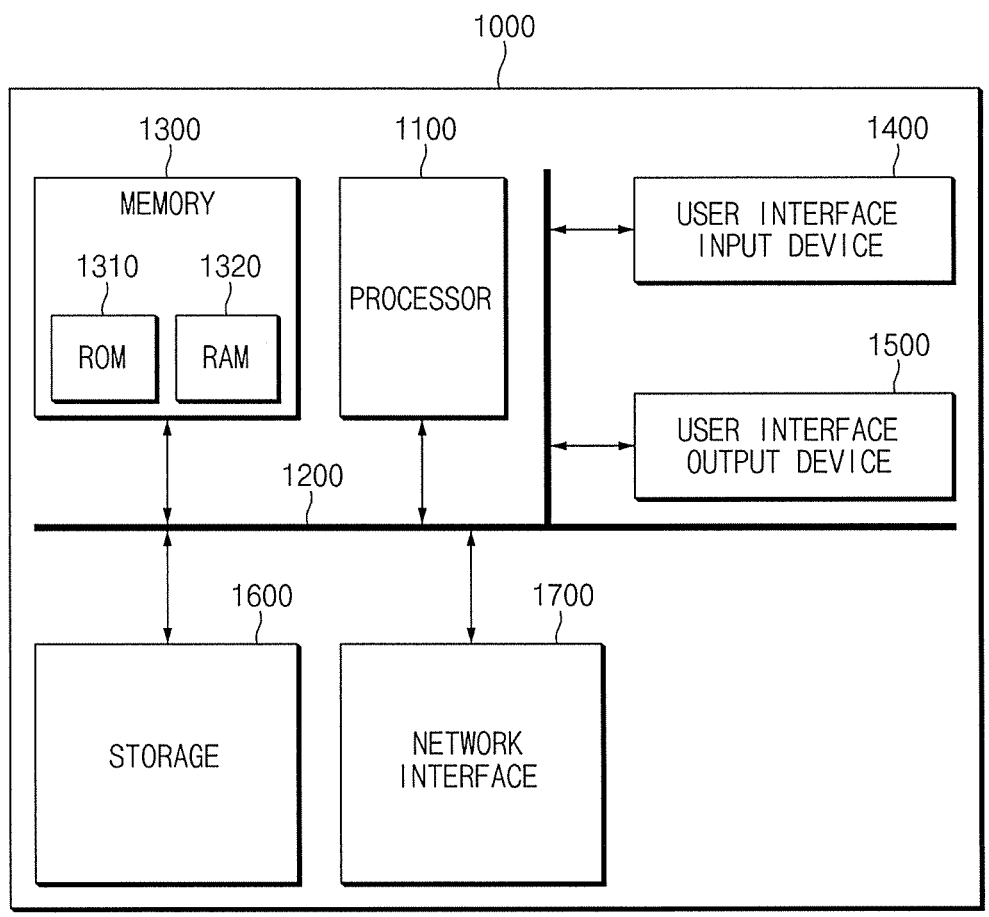
FIG. 9 is a block diagram illustrating a configuration of a computer system to which a lateral acceleration limiting method is applied, according to an embodiment of the present disclosure.

FIG. 9 is a block diagram illustrating a configuration of a computer system to which a lateral acceleration limiting method is applied, according to an embodiment of the present disclosure.

Referring to FIG. 9, a computing system 1000 may include at least one processor 1100, a memory 1300, a passenger interface input device 1400, a passenger interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or two combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

An exemplary storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a passenger terminal. Alternatively, the integrated processor and storage medium may reside as a separate component of the passenger terminal.

The present technology may perform safe driving by gradually adjusting steering torque to perform lane-keeping control while lateral acceleration is not greater than a limit value defined by the rule, upon lane-centering assist control of a vehicle.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. A lateral acceleration limiting device, the device comprising:
a processor configured to calculate current lateral acceleration of a vehicle, predict forward lateral acceleration based on a current location including a global positioning system (GPS) time delay received from a navigation device, and determine whether the predicted forward lateral acceleration and the current lateral acceleration are greater than a predetermined reference value; and a controller communicatively connected to the processor and configured to determine whether to generate a warning or whether to adjust steering torque, depending on a result determined by the processor, wherein the processor is further configured to:

adjust the steering torque depending on control of the controller, calculate current curvature of a driven road, using information about a longitudinal distance and curvature of the current location including the GPS time delay received from the navigation device, calculate forward prediction curvature of a road at a point after the vehicle is driven during a predetermined time, using information about a longitudinal direction and curvature after the vehicle is driven during the predetermined time, and estimate information about curvature having a maximum value among a plurality of forward prediction curvature values calculated from the current location of the vehicle to the point after the vehicle is driven during the predetermined time as forward maximum curvature.

2. The device of claim 1, further comprising:
a warning device communicatively connected to the controller and configured to provide the warning depending on control of the controller.

3. The device of claim 2, further comprising:
a storage configured to store at least one or more of the predicted forward lateral acceleration, the current lateral acceleration, or the steering torque.

4. The device of claim 2, wherein the processor is configured to:
estimate the forward maximum curvature of a road ahead of the driven road;
calculate the predicted forward lateral acceleration using the forward maximum curvature;
calculate the current lateral acceleration based on a current yaw rate of the vehicle; and
determine whether the predicted forward lateral acceleration or the current lateral acceleration is greater than the predetermined reference value.

5. The device of claim 4, wherein the processor is further configured to:
calculate the current lateral acceleration by multiplying the current yaw rate by a vehicle speed.

6. The device of claim 4, wherein the processor is further configured to:
determine whether the predicted forward lateral acceleration or the current lateral acceleration is greater than maximum lateral acceleration defined by a rule.

7. The device of claim 4, wherein the controller is configured to:
if at least one of the predicted forward lateral acceleration or the current lateral acceleration is greater than the predetermined reference value, determine whether a driver is in a hands-off state;
if the driver is in the hands-off state, control the warning device to output the warning to the driver, and
if the driver is not in the hands-off state, control the warning device not to output warning to the driver.

8. The device of claim 7, wherein the controller is further configured to:

after determining that the current lateral acceleration is greater than the predetermined reference value, determine whether an excess flag is "1";
if the excess flag is not "1", determine whether the current lateral acceleration is greater than a first limit value;
if the current lateral acceleration is greater than the first limit value, control the steering torque in the direction of reducing the steering torque and maintain the excess flag as "1"; and
if the current lateral acceleration is not greater than the first limit value, set the steering torque to "0" and change the excess flag to "0".

9. The device of claim 8, wherein the controller is further configured to:
if the excess flag is "1", determine whether the current lateral acceleration is greater than a second limit value which is less than the first limit value;
if the current lateral acceleration is greater than the second limit value, control the steering torque in the direction of reducing the steering torque and maintain the excess flag as "1"; and
if the current lateral acceleration is not greater than the second limit value, set the steering torque to "0" and change the excess flag to "0".

10. The device of claim 1, wherein the processor is further configured to:
calculate the predicted forward lateral acceleration by multiplying the forward maximum curvature by a vehicle speed.

11. A lateral acceleration limiting system, the system comprising:
a lateral acceleration limiting device including:
a processor configured to calculate current lateral acceleration based on a yaw rate of a vehicle, predict forward lateral acceleration based on information about curvature of a road ahead of a driven road and based on a current location including a global positioning system (GPS) time delay received from a navigation device, and determine whether the predicted forward lateral acceleration and the current lateral acceleration are greater than a predetermined reference value; and
a warning device configured to output a warning or adjust steering torque, depending on a result determined by the processor;
the navigation device communicatively connected to the processor and configured to provide the information about the curvature of the road ahead of the driven road; and
a yaw rate sensor communicatively connected to the processor and configured to provide the yaw rate,
wherein the processor is further configured to:
calculate current curvature of the driven road, using information about a longitudinal distance and curvature of the current location including the GPS time delay received from the navigation device,
calculate forward prediction curvature of a road at a point after the vehicle is driven during a predetermined time, using information about a longitudinal direction and curvature after the vehicle is driven during the predetermined time, and
estimate information about curvature having a maximum value among a plurality of forward prediction curvature values calculated from the current location of the vehicle to the point after the vehicle is driven during the predetermined time as forward maximum curvature.

12. The system of claim 11, wherein the lateral acceleration limiting device further comprises:

a controller communicatively connected to the processor and configured to determine whether to generate the warning or whether to adjust the steering torque, depending on the result determined by the processor, and wherein the processor is further configured to adjust the steering torque depending on control of the controller.

13. A lateral acceleration limiting method, the method comprising steps of:

calculating current lateral acceleration based on a yaw rate of a vehicle;

predicting forward lateral acceleration based on information about curvature of a road ahead of a driven road and based on a current location including a global positioning system (GPS) time delay received from a navigation device;

determining whether the predicted forward lateral acceleration and the current lateral acceleration are greater than a predetermined reference value; and outputting a warning or adjusting steering torque, depending on a result of the step of determining wherein the step of predicting forward lateral acceleration comprises:

calculating current curvature of the driven road, using information about a longitudinal distance and curvature of the current location including the GPS time delay received from the navigation device;

calculating forward prediction curvature of a road at a point after the vehicle is driven during a predetermined time, using information about a longitudinal direction and curvature after the vehicle is driven during the predetermined time; and estimating information about curvature having a maximum value among a plurality of forward prediction curvature values calculated from the current location of the vehicle to the point after the vehicle is driven during the predetermined time as forward maximum curvature.

14. The method of claim 13, wherein the step of predicting forward lateral acceleration comprises:

calculating the predicted forward lateral acceleration by multiplying the forward maximum curvature by a vehicle speed.

15. The method of claim 13, wherein the step of outputting the warning or adjusting steering torque comprises:

if at least one of the predicted forward lateral acceleration or the current lateral acceleration is greater than the predetermined reference value, determining whether a driver is in a hands-off state;

if the driver is in the hands-off state, controlling the warning device to output the warning to the driver; and if the driver is not in the hands-off state, controlling the warning device not to output warning to the driver.

16. The method of claim 13, wherein the step of outputting the warning or adjusting steering torque comprises:

after determining that the current lateral acceleration is greater than the predetermined reference value, determining whether an excess flag is "1";

if the excess flag is not "1", determining whether the current lateral acceleration is greater than a first limit value;

if the current lateral acceleration is greater than the first limit value, control the steering torque in the direction of reducing the steering torque and maintaining the excess flag as "1"; and if the current lateral acceleration is not greater than the first limit value, setting the steering torque to "0" and changing the excess flag to "0".

17. The method of claim 16, wherein the step of outputting the warning or adjusting steering torque comprises:

if the excess flag is "1", determining whether the current lateral acceleration is greater than a second limit value which is less than the first limit value;

if the current lateral acceleration is greater than the second limit value, control the steering torque in the direction of reducing the steering torque and maintaining the excess flag as "1"; and if the current lateral acceleration is not greater than the second limit value, setting the steering torque to "0" and changing the excess flag to "0".

* * * * *